Feb. 7, 1956 J. D. CHRISTIAN 2,733,898
HOLLOW SCREW CONVEYOR FLIGHT
Filed Dec. 2, 1952 2 Sheets-Sheet 1

INVENTOR.
JOSEPH D. CHRISTIAN
ECKHOFF & SLICK
ATTORNEYS
BY
A MEMBER OF THE FIRM

Feb. 7, 1956  J. D. CHRISTIAN  2,733,898
HOLLOW SCREW CONVEYOR FLIGHT

Filed Dec. 2, 1952  2 Sheets-Sheet 2

INVENTOR.
JOSEPH D. CHRISTIAN
ECKHOFF & SLICK
ATTORNEYS
BY
A MEMBER OF THE FIRM

United States Patent Office 2,733,898
Patented Feb. 7, 1956

2,733,898
HOLLOW SCREW CONVEYOR FLIGHT
Joseph Dennis Christian, San Francisco, Calif.
Application December 2, 1952, Serial No. 323,571
1 Claim. (Cl. 257—101)

This invention relates to heat exchange equipment.

In my prior Patent 2,321,185, of June 8, 1943, I disclosed a screw conveyor flight so constructed that a fluid could be passed through the flight in heat exchange relation to material in contact with the flight. That flight was provided by two helical flight members joined to the standard supporting the flight and to each other to provide a conduit for the heat exchange fluid. This device was utilized successfully for the heating and cooling of various materials. Later, I proposed the interleaving of two or more of such flights with adjacent flights driven in opposite directions; devices utilizing this latter construction have been used so successfully in the cooling or heating of any materials such as salt, flake caustic, cement and various other materials that handling methods and procedures for these have been revised and altered with advantage and saving to the particular industry.

The present invention is concerned with further improvements in such devices, particularly relating to the fabrication of the flights, their mounting upon the standard, improvements which enable the flights to be formed quite rapidly and, when completed, to be of such construction that the fluid conduit provided in each flight for the heat exchange fluid is one which will meet the various pressure vessel standards. Further, the flights can be readily ground and polished to provide smooth surfaces, even to a mirror-like finish, if this be desired.

It is in general the broad object of the present invention to provide an improved construction for a screw conveyor flight through which flight a heat exchange fluid can be circulated.

Another object of the present invention is to provide an improved construction for a heat exchange screw conveyor flight.

A further object is to provide a novel method for the formation of a heat exchange screw conveyor flight.

This invention includes other objects and features of advantage, some of which, together with the foregoing, will appear hereinafter wherein the preferred practice of the method of this invention and the preferred construction of the heat exchange screw conveyor flight are disclosed.

In the drawing accompanying and forming a part hereof,

Figure 4:
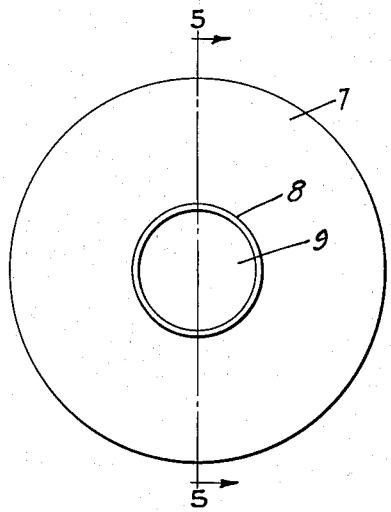
Figure 4 is a plan view of the disc shown in Figure 3 during a further step in the manufacture.
Figure 6:
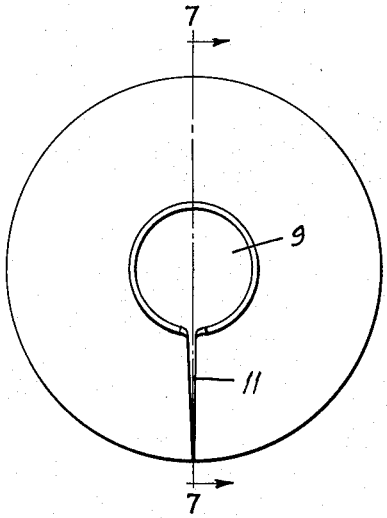
Figure 6 is a plan view of a disc at a further stage in its manufacture.
Figure 5:
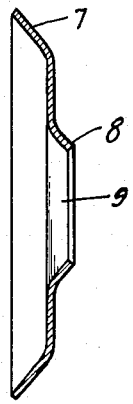
Figure 5 is a section taken through the disc shown in Figure 4 along the line 5—5 thereof.
Figure 7:
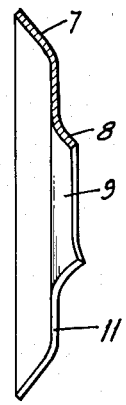
Figure 7 is a section taken along the line 7—7 in Figure 6 thereof.
Figure 3:
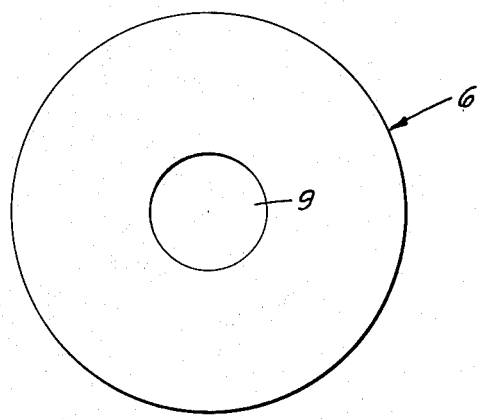
Figure 3 is a plan view of a disc from which a portion of the heat exchange screw conveyor flight is formed.

Referring to Figure 3, the helical flight embodying this invention is formed as by providing an annulus such as that generally indicated at 6 having a central opening 9. The annulus is formed of any suitable material, usually a metal. As the next step in its manufacture, the annulus 6 is placed in a die and is subjected to such pressure application that the outer peripheral portion thereof, generally indicated at 7, is flared outwardly in one direction while the inner peripheral portion 8, adjacent to the central aperture 9, is flared in an opposite direction, as is shown in Figures 4 and 5. At this stage of its manufacture, the annulus has been formed into a dish with the central portion provided with an extending neck.

In accordance with this invention, the disc is sheared radially as at 11 or a narrow radial slot 11 is cut in the disc extending from the inner aperture 9 to the periphery of the disc; the radial cut may be made in the annulus before it is bumped into a dish, but I prefer to make it after the deformation of the disc into the form of Figure 5.

Figure 8:
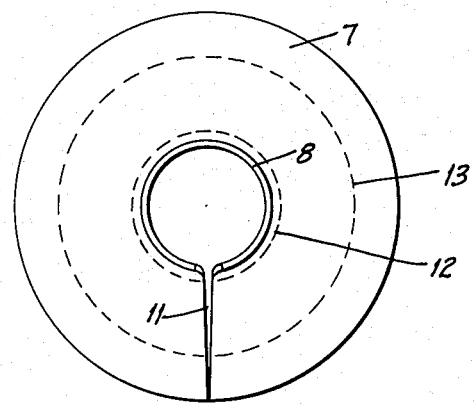
Figure 8 is a plan view of the disc shown in Figure 7, illustrating diagrammatically where forming pressure is applied to the disc to form the helical flight.

In accordance with this invention, the dish-shaped annulus is then subjected to a deforming pressure by placing it between two dies having helically formed faces (see my Patent 1,748,206) to form the annulus into a helix having the desired helix angle. This is accomplished by applying the pressure only to that area indicated between the dotted lines 12 and 13 in Figure 8 and which lies intermediate the outer peripheral portion 7 and the inner peripheral portion 8. I have found that by applying the helical formation pressure to only this area, the flare provided upon the outer peripheral portion 7 of the annulus and the flare provided on the inner peripheral portion 8 of the annulus adjacent to the opening 9 are not disturbed and the annulus can be formed into a strip having a uniform helix angle with the respective flared portion assuming the same angle.

Figure 9:
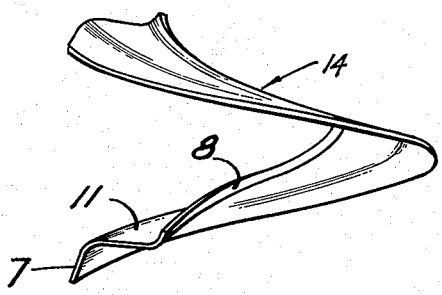
Figure 9 is a perspective view of the helical flight after its formation.

The helix so formed is generally indicated at 14 in Figure 9. It will be noted that the flared portions extend uniformly and in their original directions and to their original extent, even though the whole has been provided with a definite and uniform helix angle. Usually, in forming the desired helix angle, the strip will be extended from its original circular length at 360° to an overall circular length of approximately 400°. The initial outside diameter of the annulus and of the opening 9 are each slightly larger than those in the final flight for the deformation reduces these diameters.

Figure 1:
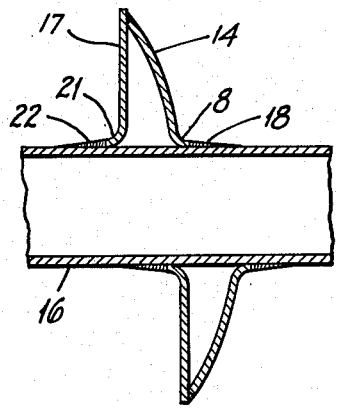
Figure 1 is a section through a heat exchange screw conveyor flight embodying the present invention.
Figure 2:
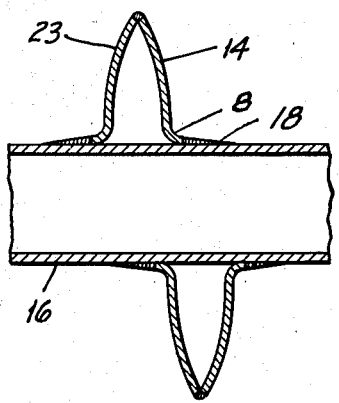
Figure 2 is a section through another form of heat exchange screw conveyor flight embodying the present invention.

The so-formed helix is then mounted upon a standard and in Figure 1 I have shown the completed helical flight 14 as mounted upon a pipe standard 16, in conjunction with a helical flight having a face 17 thereon extending radially at 90° to the standard 16. Attention is called particularly to the fact that the flared portion 8 extends along the standard and that the welding indicated at 18, which joins the flared portion 8 to the standard, is shown as tapered, the junction of the flared portion 8 and the welding with the standard being smooth and continuous. In this manner, a smooth surface and joint is provided, one which will not retain any material which may be handled. This feature is of particular advantage, for example, in the handling of various foodstuffs such as flour, tomato products, and the like, which may become subject to weevil contamination in the case of flour, or bacterial growth, in the case of tomato products. This feature is also of particular importance in the manufacture of various pharmaceutical materials, and cannot be over emphasized. For this reason, the flight 17 is flared as at 21 and is joined by a smooth, continuous weld 22 to the standard.

In place of using the flight 14 in conjunction with a flight having a face extending radially at 90° to the standard, flight 14 can be used with a complementary flight of suitable hand, such as is indicated at 23, so that both faces extend arcuately to the standard upon any radial axis at 90° to the standard. This last construction is of particular benefit in the provision of interleaved flights inasmuch as the use of these flights provides increased agitation as well as a higher ratio of heat exchange surface to unit volume of material in the device.

In welding the flights in place on the standard, the latter is positioned horizontally, the flights tack-welded in place and then welded with plain flat fillet welds. This enables the welding to be effected with automatic machines, if desired. That the present structure can be assembled with automatic welding equipment is a feature of considerable importance, particularly in that this can be achieved with the standard to which the flights are welded in a horizontal position. When the flights of my prior Patent 2,321,185 have been assembled with automatic welding machines, it is necessary to incline the standard at a very steep angle and, as a consequence, a close pitch flight could not be manufactured. With the standard in a horizontal plane, this limitation is removed.

I claim:

A screw conveyor flight comprising a standard having a longitudinal axis and providing a central support for the flight, a first helix member having an exposed face and an inner face defining one wall of a fluid conduit and having an inner helical portion flared to extend away from the exposed face of said member and along and in engagement with the standard and terminating with an edge extending substantially normal to the longitudinal axis of said standard, welding joining the terminal edge of said first helix member to said standard, said welding smoothly continuing the flare of said first helix member to a junction with the surface of the standard, a second helix member having an exposed face and an inner face defining one wall of a fluid conduit and having its inner helical portion flared to extend away from the exposed face of said second member and along the standard in spaced longitudinal axial alignment with the terminal edge of the first, said second helix member terminating with an edge extending substantially normal to the longitudinal axis of said standard, said helix members extending outwardly from the standard in a spaced relation to one another and into abutment adjacent their outer peripheral edges and being joined together to provide a helical fluid conduit, and other welding joining the terminal edge of said second helix member to the standard, said other welding smoothly continuing the flare of said second helix member to a junction with the surface of the standard.

References Cited in the file of this patent

UNITED STATES PATENTS

| | | |
|---|---|---|
| 1,738,994 | Gredell | Dec. 10, 1929 |
| 1,818,492 | McFarland | Aug. 11, 1931 |
| 1,987,952 | Wilson | Jan. 15, 1935 |
| 2,027,185 | Loomis | Jan. 7, 1936 |
| 2,321,185 | Christian | June 8, 1943 |
| 2,610,033 | Rietz | Sept. 9, 1952 |

FOREIGN PATENTS

| | | |
|---|---|---|
| 23,635 | Germany | Sept. 27, 1883 |
| 110,691 | Germany | May 11, 1900 |
| 156,821 | Germany | Dec. 2, 1904 |